US00RE35776E

United States Patent [19]

Sugano et al.

[11] E Patent Number: Re. 35,776

[45] Reissued Date of Patent: Apr. 28, 1998

[54] AUTOMATIC CONTROL SYSTEM FOR THERMAL POWER PLANT

[75] Inventors: Akira Sugano; Sachio Yamanobe, both of Katsuta, Japan

[73] Assignees: Hitachi, Ltd., Tokyo; Hitachi Engineering Co., Ltd., Ibaraki-ken, both of Japan

[21] Appl. No.: 801,637

[22] Filed: Dec. 4, 1991

Related U.S. Patent Documents

Reissue of:

[64] Patent No.: 4,653,276
Issued: Mar. 31, 1987
Appl. No.: 837,347
Filed: Mar. 7, 1986

U.S. Applications:

[63] Continuation of Ser. No. 577,067, Sep. 4, 1990, abandoned, which is a continuation of Ser. No. 331,296, Mar. 31, 1989.

[30] Foreign Application Priority Data

Mar. 13, 1985 [JP] Japan ..... 60-48344

[51] Int. Cl.[6] ..... F22D 5/00

[52] U.S. Cl. ..... 60/665; 60/660; 122/448.1; 290/40 C

[58] Field of Search ..... 60/652, 660–667; 122/448.1, 448.2, 448.3, 448.4; 236/14; 290/40 R, 40 B, 40 C, 40 F, 51

[56] References Cited

U.S. PATENT DOCUMENTS 3,894,396 7/1975 Durrant ..... 60/665
4,319,320 3/1982 Sato et al. ..... 60/665 X

*Primary Examiner*—Stephen F. Husar
*Attorney, Agent, or Firm*—Antonelli, Terry, Stout, & Kraus, LLP

[57] ABSTRACT

An automatic control system for a thermal power plant comprises a master controller controlling a turbine in response to an externally applied load command signal, and producing a boiler input command signal by correcting the load command signal on the basis of the detected pressure of main steam generated from a boiler, and a water/steam process controller, a fuel process controller, a combustion process controller and a draft process controller to all of which the boiler input command signal is applied from the master controller. The process controllers apply control signals to equipments controlling a water/steam process, a fuel process, a combustion process and a draft process respectively among the terminal actuating equipments of the various parts of the boiler.

19 Claims, 3 Drawing Sheets

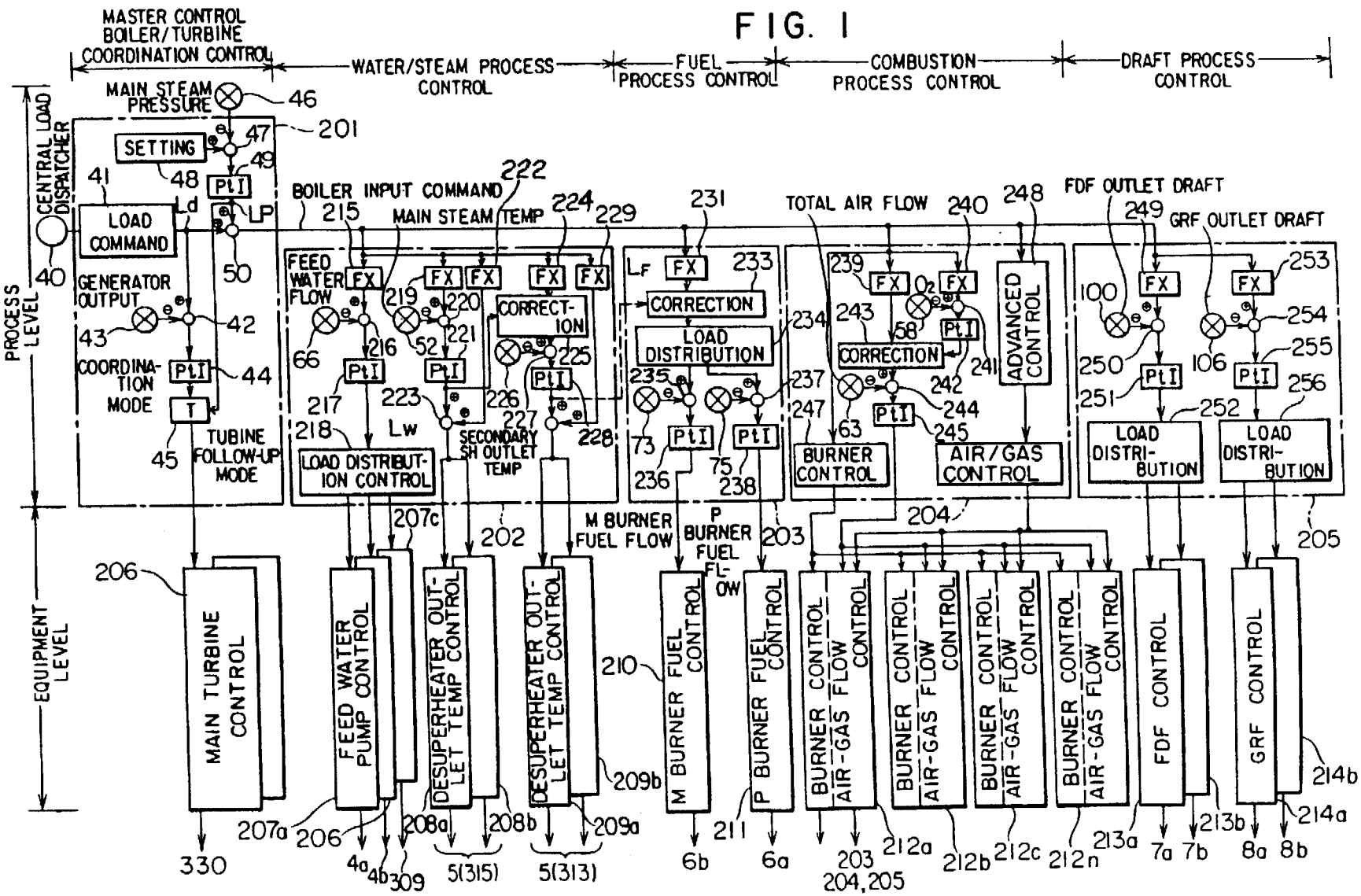
FIG. 1
MASTER CONTROL BOILER/TURBINE COORDINATION CONTROL
WATER/STEAM PROCESS CONTROL
FUEL PROCESS CONTROL
COMBUSTION PROCESS CONTROL
DRAFT PROCESS CONTROL
MAIN STEAM PRESSURE
SETTING
LOAD COMMAND
GENERATOR OUTPUT
COORDINATION MODE
TUBINE FOLLOW-UP MODE
BOILER INPUT COMMAND
MAIN STEAM TEMP
FEED WATER FLOW
CORRECTION
LOAD DISTRIBUTION
LOAD DISTRIBUTION CONTROL
SECONDARY SH OUTLET TEMP
M BURNER FUEL FLOW
P BURNER FUEL FLOW
TOTAL AIR FLOW
ADVANCED CONTROL
AIR/GAS CONTROL
BURNER CONTROL
FDF OUTLET DRAFT
GRF OUTLET DRAFT
CENTRAL LOAD DISPATCHER
PROCESS LEVEL
EQUIPMENT LEVEL
MAIN TURBINE CONTROL
FEED WATER PUMP CONTROL
DESUPERHEATER OUT-LET TEMP CONTROL
M BURNER FUEL CONTROL
P BURNER FUEL CONTROL
BURNER CONTROL
AIR-GAS FLOW CONTROL
FDF CONTROL
GRF CONTROL

AUTOMATIC CONTROL SYSTEM FOR THERMAL POWER PLANT

Matter enclosed in heavy brackets [ ] appears in the original patent but forms no part of this reissue specification; matter printed in italics indicates the additions made by reissue.

*This application is a continuation of application Ser. No. 577,067, filed Sep. 4, 1990, now abandoned, which is a continuation of application Ser. No. 331,296, filed Mar. 31, 1989, now abandoned, which is a reissue of application Ser. No. 837,347, filed Mar. 7, 1986 which issued as U.S. Pat. No. 4,653,276.*

BACKGROUND OF THE INVENTION

This invention relates to an automatic control system for a thermal power plant, and more particularly to an automatic control system of the kind described above which is effective for lessening mutual interference between individual processes and suitable for application to decentralized control of unit processes.

In order that a thermal power plant generates a desired electrical output, it is necessary to control process variables such as quantities of fuel, feed water and air, thereby generating steam at a temperature and a pressure matching the desired electrical output. However, the process variables described above are greatly interrelated with one another, and it is difficult to attain stable control of all the process variables at the same time. For example, an increase in the quantity of feed water results in a corresponding decrease in the temperature of main steam. In order to compensate for this temperature drop of main steam, the quantity of fuel must be increased, and, at the same time, air must be supplied in a quantity corresponding to the increased quantity of fuel. As described above, the process variables are closely interrelated with one another. Because of the close interrelation among the process variables, an automatic control system of very complex structure is required for the control of the thermal power plant. As a prior art example of such a control system, a system having a structure as described below is reported in a magazine entitled "Hitachi Review" Vol. 65, No. 9 (1983–9), pp. 603–608.

In the method employed in the reported system, controlling the opening of a turbine inlet control valve is controlled according to a load command signal applied to the thermal power plant. On the other hand, at the boiler side, the flow rate of feed water to the boiler is controlled according to a boiler input command signal obtained by correcting the load command signal by adding thereto a pressure compensating signal produced by subjecting a deviation of the main steam pressure from its desired value to proportional plus integral operation, and a fuel flow-rate is controlled according to a fuel command signal obtained by correcting the boiler input command signal by adding thereto a temperature compensating signal produced by subjecting a deviation of the main steam temperature from its desired value to proportional plus integral operation. Further, flow-rates of feeding gas and air are controlled by an air flow-rate command signal obtained by correcting the fuel command signal by adding thereto an oxygen concentration signal produced by subjecting a deviation of the oxygen concentration in the furnace draft gas from its desired value to proportional plus integral operation. According to the prior art method described above, main steam of good quality can be generated as a result of the control. However, the reported system is defective in that a large length of time is required until finally all of the interrelated process variables are properly corrected thereby to completely stabilize the electrical output of the plant. Also, even when the electrical output of the plant is stabilized, many terminal equipments relating to the plant control may be still unstabled, resulting in a low efficiency of the plant as a whole. Further, when any one of the compensation signal generating sections for obtaining the signals used for correcting the flow rates of feed water, fuel, gas and air on the basis of the detected pressure and temperature of main steam and concentration of oxygen in furnace gases fails to normally operate or becomes abnormal, for example, when the compensation signal generating section relating to the pressure of main steam becomes abnormal, all of feed water, fuel, gas and air control sections downstream of the abnormal compensation signal generating section are adversely affected. This means that a multiplex control system arrangement or a decentralized control system arrangement must be adopted in order to ensure the reliability of the control system, resulting inevitably in an expensive system.

SUMMARY OF THE INVENTION

With a view to obviate the prior art defects pointed out above, it is a primary object of the present invention to provide an automatic control system for a thermal power plant, in which individual processes of the plant are independently controlled so that they are least interrelated with one another.

In contrast to the prior art control system in which the boiler input command, fuel flow-rate command and air flow-rate command signals are obtained by correcting the load command signal successively by the pressure compensating signal, temperature compensating signal and oxygen concentration compensation signal, the plant control system of the present invention is featured in that the boiler input command, fuel flow-rate command and air flow-rate command signals are obtained directly from the load command signal through the individual function generators, respectively. Thereafter, if necessary, the respective command signals are corrected by the pressure, temperature and furnace gas oxygen concentration compensation signals, respectively.

BRIEF DESCRIPTION OF THE DRAWINGS

FIG. 1 is a block diagram showing the structure of a preferred embodiment of the automatic plant control system according to the present invention.

DESCRIPTION OF THE PREFERRED EMBODIMENT

Figure 2:
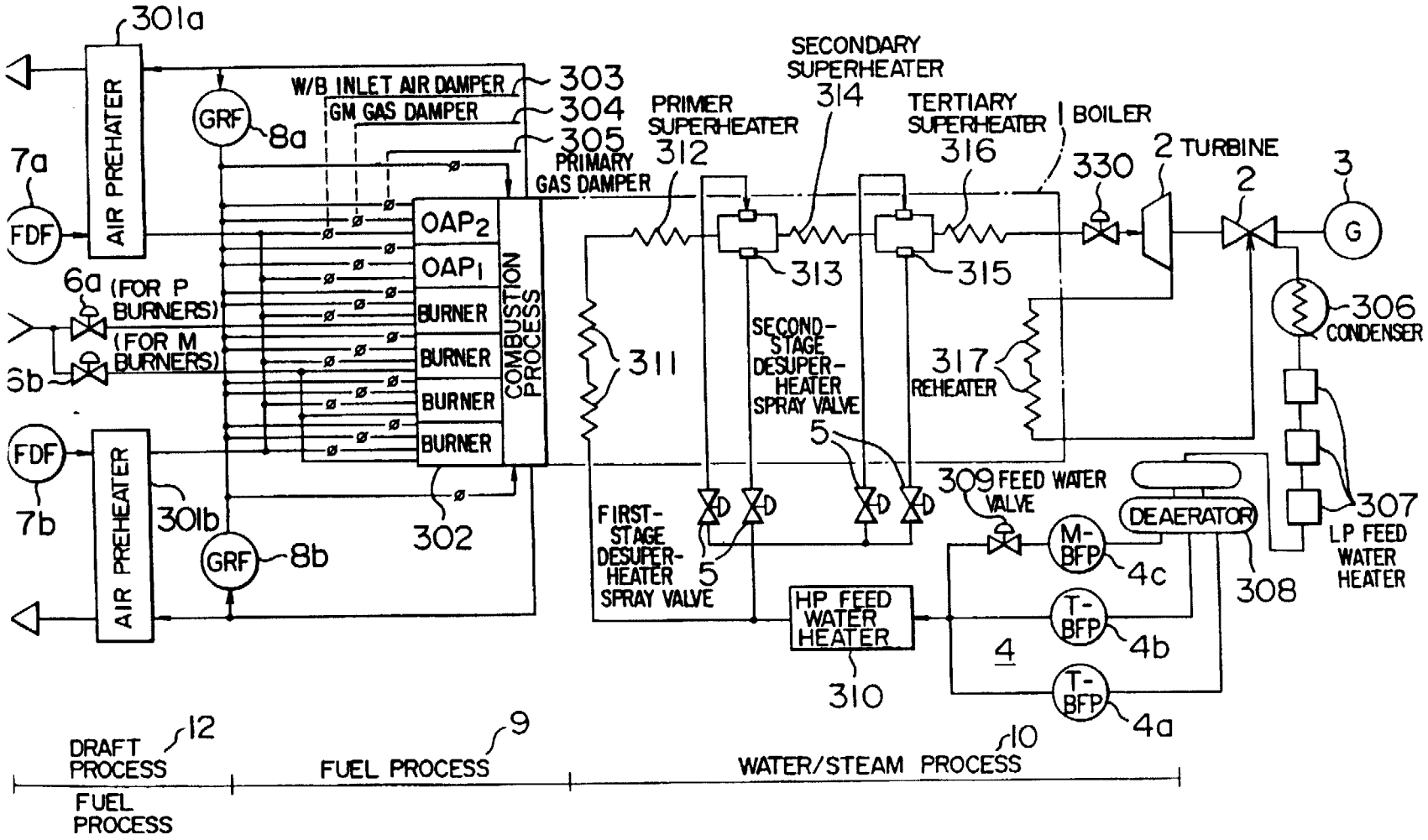
FIG. 2 is a diagrammatic view showing the structure of a thermal power plant to which the present invention is applied.

A thermal power plant to which the present invention is applied has a structure as schematically shown in FIG. 2.

Referring to FIG. 2, the thermal power plant includes a boiler 1 shown by the one-dot chain lines, a turbine 2, a generator 3, a feed water pump 4 including turbines 4a, 4b, 4c, spray valves 5, fuel valves 6a, 6b, forced draft fans 7a, 7b and gas recirculating fans 8a, 8b. Air preheaters 301a and 301b preheat combustion air by heat exchange with combustion exhaust gases. A burner part 302 is divided into a plurality of burner stages in each of which the air-fuel ratio is controlled for the purpose of furnace denitration. Window-box inlet air dampers 303 regulate the flow rate of combustion air in the respective burner stages. Mixing gas (GM gas) dampers 304 regulate the flow rate of combustion exhaust gases injected into combustion air. Primary gas dampers 305 regulate the flow rate of combustion exhaust gases injected directly into the burner part 302. The thermal power plant further includes a condenser 306, low-pressure feed water heaters 307, a deaerator 308, a feed water valve 309, a high-pressure feed water heater 310, an evaporator 311, a primary superheater 312, a first-stage desuperheater 313, a secondary superheater 314, a second-stage desuperheater 315, a tertiary superheater 316, a reheater 317, and a turbine inlet control valve 330. When classified according to variables related to the operation of the boiler, the thermal power plant is divided into four processes, that is, a combustion process 9, a water/steam process 10, a fuel process 11 and a draft process 12.

The structure of the thermal power plant shown in FIG. 2 is not an especial one, and the control system of the present invention which will be described in detail now is widely applicable to thermal power plants presently put into practical use.

A preferred embodiment of the plant control system according to the present invention will be described with reference to FIG. 1.

Referring to FIG. 1, the plant control system embodying the present invention comprises a master controller 201, a first process controller 202 controlling the water/steam process 10 shown in FIG. 2, a second process controller 203 controlling the fuel process 9 shown in FIG. 2, a third process controller 204 controlling the combustion process 11 shown in FIG. 2, and a fourth process controller 205 controlling the draft process 12 shown in FIG. 2. These controllers 201 to 205 are process-level controllers.

The plant control system further comprises a speed governing controller 206 controlling the main turbine 2, controllers 207a to 207c controlling the respective turbines 4a to 4c of the feed water pump 4, controllers 208a and 208b controlling the spray valves 5 associated with the second-stage desuperheater 315, controllers 209a and 209b controlling the spray valves 5 associated with the first-stage desuperheater 313, a controller 210 controlling the flow rate of fuel supplied to main burners M, a controller 211 controlling the flow rate of fuel supplied to planet burners P controllers 212a to 212n controlling the flow rates of air and recirculated gas and also controlling the burners in the respective burner stages, controllers 213a and 213b controlling the respective forced draft fans 7a and 7b, and controllers 214a and 214b controlling the respective gas recirculating fans 8a and 8b. These controllers 206 to 214 are equipment-level controllers.

Generally, an electric power generation company has a central load-dispatching station which decides the outputs of its associated power plants based on the total power demand required to be supplied by the company and transmits power instruction signals corresponding to the decided power outputs, respectively, to the power plants. The power generation of each power station is controlled based on the power instruction transmitted thereto such that its actual power generation dose not exceed upper and lower limits predetermined with respect to a power level represented by the power instruction. In FIG. 1, such a central load-dispatching station is shown by a reference numeral 40, from which the power instruction is applied to the master controller 201 in which a circuit 41 produces, based on the power instruction indicating merely a specific power level, a ramp-shaped load command signal Ld having a predetermined load variation rate by taking into account the present status of that power plant as well as the above-mentioned upper and lower limits. The power generation of the power plant is controlled based on the load command Ld thus produced. This load command signal Ld is compared in a subtractor 42 with a signal 43 indicative of the detected electrical output of the generator 3. The resultant output signal of the subtractor 42 is applied to a circuit 44 making proportional plus integral operation, and the output signal of the proportional plus integral circuit 44 is applied through a selector 45 to the main turbine controller 206 to control the turbine inlet control valve 330 shown in FIG. 2. The selector 45 is switched over by an interlock described later. A detector 46 detects the pressure of main steam (the pressure of main steam at the boiler outlet). A signal indicative of the detected steam pressure is compared in a subtracter 47 with a setting supplied from a setting circuit 48, and the output signal indicative of the error therebetween is applied to a circuit 49 making proportional plus integral operation. The output signal Lp of the proportional plus integral circuit 49, which has the same dimension as that of the load command, is added in an adder 50 to the load command signal Ld to provide a boiler input command signal $L_B$. The output signal Lp of the proportional plus integral circuit 49 is also applied to the main turbine controller 206 through the selector 45. This selector 45 is switched over depending on the operation mode of the plant. More precisely, the operation of the thermal power plant is classified into two modes, that is a coordination mode in which both the control of the main turbine and the control of the feeding water, fuel supply or the like of the boiler are carried out by the load command signal and a turbine follow-up mode in which only the control of the boiler side is carried out by the load command signal and if the resultant main steam pressure is deviated from its desired value, the opening of the turbine inlet control valve is controlled so as to obtain the desired pressure value. Thus, in the turbine follow-up mode, in which the pressure of main steam may be controlled by the turbine inlet control valve 330, the output signal of the selector 45 is the input signal applied from the proportional plus integral circuit 49. On the other hand, in the coordination mode, the output signal of the proportional plus integral circuit 44 appears directly as the output signal of the selector 45. The output of the adder 50 is the boiler input command signal $L_B$ provided by adding the signal Lp, indicative of the amount of correction of the error of the main steam pressure from the setting, to the plant load command signal Ld appearing from the circuit 41, and this boiler input command signal $L_B$ is applied to all of the process controllers 202 to 205.

Figure 3A:
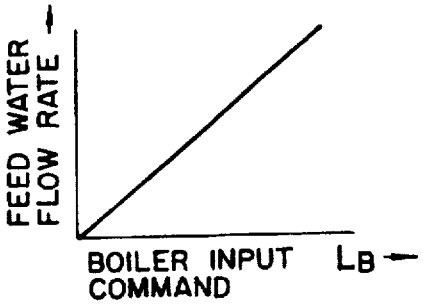
FIGS. 3a to 3h show the output characteristics of the function generators, respectively, with respect to the boiler input command.
Figure 3B:
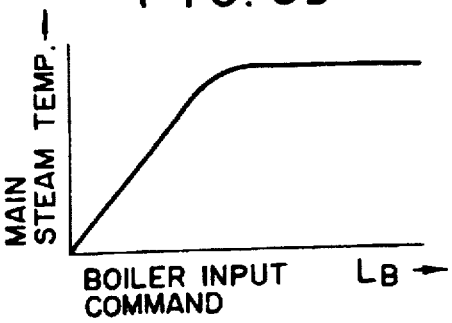
Figure 3C:
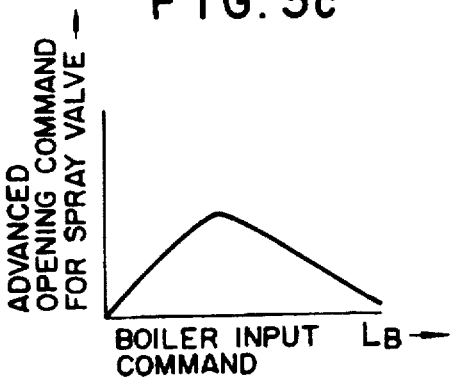

The water/steam process controller 202 includes a first function generator 215 which is programmed to produce a feed-water flow-rate command signal as a function of the boiler input command signal $L_B$ which is the output of the adder 50, as shown in FIG. 3a. A signal 66 indicative of the detected flow rate of feed water is compared in a subtracter 216 with the feed-water flow-rate command signal which is the output of the function generator 215, and a signal indicative of the error therebetween is applied to a proportional plus integral circuit 217. The output of this proportional plus integral circuit 217 provides a feed-water pump flow-rate command signal Lw. This command signal Lw is distributed by a load distribution control circuit 218 to the individual feed-water pump controllers 207a to 207c which control the turbines 4a, 4b and feed water valve 309 respectively. That is, in FIG. 1, the output of the proportional plus integral circuit 217 is the command signal for the feeding water flow-rate. However, generally the feeding water is controlled by a plurality of water pumps and hence the output of the circuit 217 is divided by the load distribution control circuit 218 into individual command signals for controlling the outputs of the respective water pumps by taking into account the capacities of the respective pumps as well as the present status in operation of the pumps. A second function generator 219 is programmed to produce a signal indicative of the desired temperature of main steam as a function of the boiler input command signal $L_B$ as shown in FIG. 3b. A signal 52 indicative of the detected temperature of main steam is compared in a subtractor 220 with the temperature setting provided by the output signal of the function generator 219, and the resultant signal indicative of the error therebetween is applied to a proportional plus integral circuit 221. A third function generator 222 is programmed to produce a signal indicative of an opening of the spray valve, which determines the outlet temperature of the second-stage desuperheater 315, as a function of the boiler input command signal $L_B$, as shown in FIG. 3c. The output signal of the function generator 222 is added in an adder 223 to the output signal of the proportional plus integral circuit 221 indicative of the amount of correction of the error of the detected main steam temperature from the setting. The output of the adder 223 provides a signal indicative of the setting of the outlet temperature of the second-stage desuperheater 315. Such a signal is applied to the desuperheater outlet temperature controllers 208a and 208b to control the flow rate of spray supplied through the spray valves 5 to the second-stage desuperheater 315.

In the water/steam process controller 202, a fourth function generator 224, which is similar to the function generator 219 is programmed to produce a signal indicative of the outlet temperature of the secondary superheater 314 shown in FIG. 2, as a function of the boiler input command signal $L_B$. The output signal of the proportional plus plus integral circuit 221 is indicative of the amount of correction of the outlet temperature of the second-stage desuperheater 315 due to the error of the detected temperature of main steam from the setting. This output signal is applied to a correction circuit 225. The correction circuit 225 corrects the setting of the outlet temperature of the secondary superheater 314 (the output signal of the function generator 224) on the basis of the signal applied from the proportional plus integral circuit 221 so as to attain a balance between the sprays supplied to the first-stage and second-stage desuperheaters 313 and 315. That is, this balance may be unnecessary if the boiler characteristics are good. However, when the boiler characteristics are changed due to some reasons such as ageing, the output of the function generator is modified by the correction circuit 225 to obtain the balance between the sprays as supplied. A signal 226 indicative of the detected outlet temperature of the secondary superheater 314 is compared in a subtractor 227 with the corrected setting signal applied from the correction circuit 225, and the resultant signal indicative of the error therebetween is applied to a proportional plus integral circuit 228. A fifth function generator 229, which is similar to the function generator 222, is programmed to produce a signal for determining the outlet temperature of the first-stage desuperheater 313 as a function of the boiler input command signal $L_B$. The output signal of the proportional plus integral circuit 228 indicative of the amount of correction of the outlet temperature of the secondary superheater 314 is added in an adder 230 to the output signal of the function generator 229 to provide a signal indicative of the setting of the outlet temperature of the first-stage desuperheater 313, and the output signal of the adder 230 is applied to the desuperheater outlet temperature controllers 209a and 209b which control the flow rate of spray supplied through the spray valves 5 to the first-stage desuperheater 313.

Figure 3D:
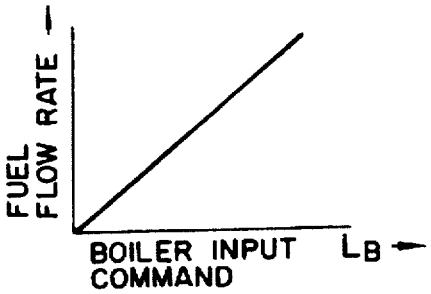

The fuel process controller 203 includes a sixth function generator 231 which is programmed to [produoe] *produce* a fuel flow-rate command signal $L_F$ as a function of the boiler input command signal $L_B$, as shown in FIG. 3d. The output signal of the proportional plus integral circuit 228, indicative of the amount of correction of the setting of the outlet temperature of the first-stage desuperheater 313, [is] *as shown in dashed line, may be optionally* applied together with the output signal of the function generator 231 to a correction circuit 233 which corrects the fuel flow-rate command signal $L_F$ on the basis of the output signal of the proportional plus integral circuit 228 for the purpose of constant spray control. A fuel distribution circuit 234 distributes the fuel flow-rate command signal $L_F$ to the fuel valve 6b for the main burners M and to the fuel valve 6a for the planet burners P. A signal 73 indicative of the detected flow rate of fuel supplied to the main burners M is compared in a subtractor 235 with the command signal applied from the fuel distribution circuit 234, and the resultant signal is applied to a proportional plus integral circuit 236 which produces a command signal applied to the main-burner fuel flow-rate controller 210. Also, a signal 75 indicative of the detected flow rate of fuel supplied to the planet burners P is compared in a subtractor 237 with the command signal applied from the fuel distribution circuit 234, and the resultant signal is applied to a proportional plus integral circuit 238 which produces a command signal applied to the planet-burner fuel flow-rate controller 211.

Figure 3E:
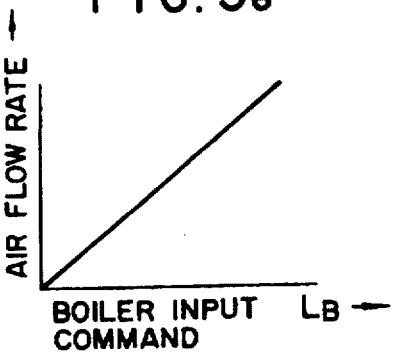
Figure 3F:
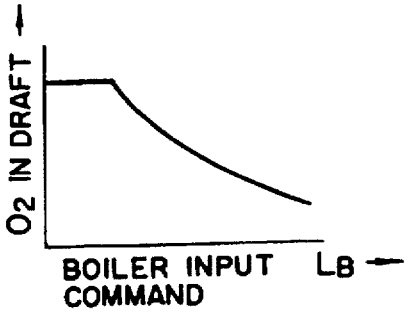

The fuel process controller 204 includes a seventh function generator 239 which is programmed to produce an air flow-rate command signal $L_A$ as a function of the boiler input command signal $L_B$, as shown in FIG. 3e. An eighth function generator 240 is programmed to produce a signal for setting the concentration of $O_2$ in exhaust gases as a function of the boiler input command signal $L_B$, as shown in FIG. 3f. A signal 58 indicative of the detected $O_2$ concentration is compared in a subtractor 241 with the setting applied from the function generator 240, and the resultant signal is applied to a proportional plus integral circuit 242. The output signal of the proportional plus integral circuit 242 is applied together with the air flow-rate command signal $L_A$ from the function generator 239 to a correction circuit 243. In the correction circuit 243, the air flow-rate command signal $L_A$ is corrected to provide a corrected air flow-rate command signal $L_{AA}$. A signal 63 indicative of the detected total flow rate of air is compared in a subtractor 244 with the setting signal applied from the correction circuit 243, and the resultant signal is applied to a proportional plus integral circuit 245 to appear as a signal indicative of the corrected flow rate of air to be supplied to each of the burner stages. Such a command signal is applied to each of the air and gas flow-rate controllers 212a to 212n. The output signals of the controllers 212a to 212n control the window-box inlet air dampers 303, GM dampers 304 and primary gas dampers 305 respectively. On the basis of the boiler input command signal $L_B$, a circuit 247 determines the optimum number of burners and the optimum pattern for each of the burner stages. An advanced control circuit 248 prevents an unbalance between the flow rates of air and fuel at the time of ignition and extinction of the burners.

Figure 3G:
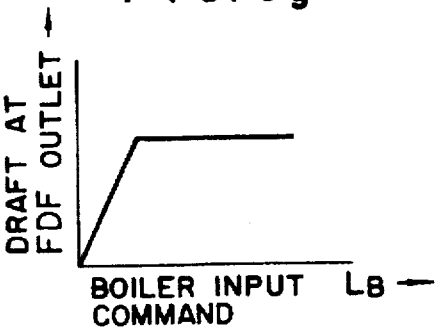
Figure 3H:
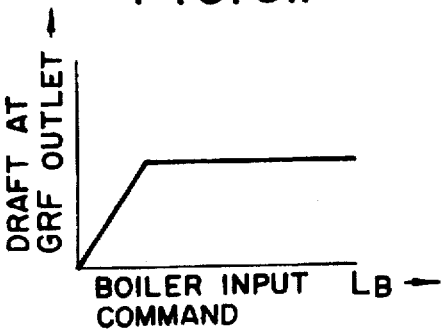

In the draft process controller 205, a ninth function generator 249 is programmed to produce a signal for setting the flow rate of draft at the outlets of the forced draft fans (FDF) 7a and 7b as a function of the boiler input command signal $L_B$, as shown in FIG. 3g. A signal 100 indicative of the detected flow rate of draft at the outlets of the forced draft fans 7a and 7b is compared in a subtractor 250 with the setting signal applied from the function generator 249, and the resultant signal is applied to a proportional plus integral circuit 251. The proportional plus integral circuit 251 produces a command signal commanding the angular position of the rotor blades of the forced draft fans 7a and 7b, and this command signal is applied to the forced draft fan controllers 213a and 213b through a load distribution circuit 252, thereby controlling the forced draft fans 7a and 7b. A tenth function generator 253 is programmed to produce a signal for setting the flow rate of draft at the outlets of gas recirculating fans (GRF) 8a and 8b as a function of the boiler input command signal $L_B$, as shown in FIG. 3h A signal 106 indicative of the detected flow rate of draft at the outlets of the gas recirculating fans 8a and 8b is compared in a subtractor 254 with the setting signal applied from the function generator 253, and the resultant signal is applied to a proportional plus integral circuit 255. The proportional plus integral circuit 255 produces a command signal commanding the opening of the inlet dampers of the gas recirculating fans 8a and 8b, and this command signal is applied to the gas recirculating fan controllers 214a and 214b through a load distribution circuit 256, thereby controlling the gas recirculating fans 8a and 8b.

The advantages of the plant control system embodying the present invention will now be described.

Objects to be controlled by the master controller 201 are limited to the load and the pressure of main steam, and the boiler input command signal $L_B$ only is applied from the master controller 201 to the process controllers 202 to 205. The process controllers 202 to 205 can simultaneously set the controlled parameters for the associated equipments in response to the application of the boiler input command signal $L_B$. Thus, the characteristics in response of the system are improved as compared with the prior system in which the various parameters are set successively upon receiving the load command signal. Further, for that reasons, the correction control of a parameter of a certain processor relative to the other processor is almost unnecessary, resulting in improved stability in operation of the system.

The equipment controllers belonging to some of the process controllers control a plurality of same equipments. Therefore, the so-called N:1 design, where design of one controller is applicable to N controllers, can be realized to standardize and simplify the design.

Further, the control of the flow rates of air and gas and the control of the burner in each burner stage of the boiler can be attained by one and the same controller, thereby greatly decreasing the number of required signal lines.

It will be understood from the foregoing detailed description of the present invention that unit processes and unit equipments in a thermal power plant can be independently controlled with least mutual interference therebetween.

According to the present invention, the master controller participates in the control of the load and the control of the pressure of main steam, and a boiler input command signal only is applied from the master controller to the process controllers. In response to the application of the boiler input command signal, the process controllers control the associated processes independently of one another and control also the load distribution to their subordinate equipment controllers. The so-called N:1 design of the equipment controllers belonging to some of the process controllers can be realized to permit standardization of the design. Therefore, the present invention provides a plant control system which can operate with high reliability and can be easily designed without redundancy of the master and process controllers.

What is claimed is:

1. An automatic control system for a thermal power plant including a boiler, a turbine and power generator, comprising means for correcting a load command signal applied to the thermal power plant by comparing the load command signal with a feedback signal indicative of a detected pressure of main steam of the boiler thereby producing a boiler input command signal, and means including a plurality of function generators for generating setting signals of the flow rates of feed water, fuel and air respectively in response to the application of said boiler input command signal, so that the flow rates of feed water, fuel and air are feed-back controlled based on said setting signals.

2. A plant control system as claimed in claim 1, further comprising means including a function generator for generating a setting signal of the temperature of main steam, and means for comparing said setting signal with a feedback signal indicative of the detected temperature of main steam thereby producing a command signal for controlling the flow rate of spray supplied to a desuperheater disposed midway of main steam piping.

3. An automatic control system for a thermal power plant including a boiler, a turbine and a power generator, comprising means for correcting a load command signal applied to the thermal power plant by comparing the load command signal with a feedback signal indicative of a detected pressure of main steam of the boiler thereby producing a boiler input command signal, means including function generators for generating setting signals of the flow rates of feed water and main steam temperature respectively for the purpose of controlling steam produced by the boiler in response to the application of said boiler input command signal, means including a function generator for generating a setting signal of the flow rate of fuel for controlling a fuel supplied to the boiler in response to the application of said boiler input command signal, means including a function generator for generating a setting signal for a total flow rate of air for controlling fuel combustion in the boiler in response to the application of said boiler input command signal, and means including a function generator for generating a setting signal of the flow rate of draft at the outlets of forced draft fans for controlling a draft process of the boiler in response to the application of said boiler input command signal, so that individual terminal actuating equipments can be controlled on the basis of said setting signals.

4. A plant control system as claimed in claim 3, wherein process controllers are disposed to control the steam produced by the boiler, the fuel supplied to the boiler the fuel, combustion process thereof and the draft process respectively, and said means for producing said boiler input command signal on the basis of said load command signal applied to the thermal power plant is disposed in a master controller.

5. A plant control system as claimed in claim 3, further comprising a first function generator generating an air flow-rate command signal in response to the application of said boiler input command signal, a second function generator generating a setting signal of the oxygen concentration of exhaust gases in response to the application of said boiler input command signal, control means for comparing the setting signal generated from said second function generator with a feedback signal indicative of the detected oxygen concentration, and means for producing a corrected air flow-rate command signal on the basis of the output signal of said control means and the output signal of said first function generator and applying said corrected air flow-rate command signal to said combustion process as a total air flow-rate command signal.

6. An automatic control system for a thermal power plant, comprising a master controller controlling a turbine in response to an [extenrally] *externally* applied load command signal and producing a boiler input command signal by correcting said load command signal on the basis of the detected pressure of main steam generated from a boiler so as to control various parts of the boiler by said boiler input command signal, a water/steam process controller applying, in response to the application of said boiler input command signal, control signals to equipments controlling a water/steam process among terminal actuating equipments of various parts of the boiler, a fuel process controller applying, in response to the application of said boiler input command signal, control signals to equipments controlling a fuel process among the terminal actuating equipments of various parts of the boiler, a combustion process controller applying, in response to the application of said boiler input command signal, control signals to equipments controlling a combustion process among the terminal actuating equipments of various parts of the boiler, and a draft process controller applying, in response to the application of said boiler input command signal, control signals to equipments controlling a draft process among the terminal actuating equipments of various parts of the boiler.

*7. An automatic control system for an electric power plant comprising:*

*a master controller responsive to an external load command signal for producing a first command signal indicative of an amount of electric power to be generated by the power plant;*

*a plurality of subsystems providing individual flows of materials for executing respective processes relating to generation of the electric power by controlling the flows of materials, respectively;*

*subsystem controllers coupled to the subsystems, respectively, each of said subsystem controllers being solely responsive to said first command signal for determining definitely a second command signal indicative of a set value of given variable of the process executed by the associated subsystem for generating the electric power indicated by said first command signal;*

*means coupled to each of said subsystem controllers and responsive to the second command signal predetermined definitely by the associated subsystem controller for producing a third command signal for controlling the flow of material in the associated subsystem so that the given variable of the process executed by the associated subsystem assumes the set value indicated by the second command signal; and*

*means responsive to the third command signal for controlling the flow of material in the associated subsystem based on the third command signal.*

*8. An automatic control system as claimed in claim 7, wherein each of said subsystem controllers includes a function generator having a preset program solely responsive to said first command signal for determining definitely the second command signal as an output thereof.*

*9. An automatic control system for an electric power plant comprising:*

*a master controller responsive to an external load command signal for producing a first command signal indicative of an amount of electric power to be generated by the power plant;*

*subsystem controllers coupled to a plurality of subsystems providing individual flows of materials for executing respective processes relating to generation of the electric power by controlling the flows of materials, respectively, each of said subsystem controllers being solely responsive to said first command signal for predetermined definitely a second command signal indicative of a target value of given variable of the process executed by the associated subsystem for generating the electric power indicated by said first command signal; and*

*means coupled to each of said subsystem controllers and responsive to said second command signal determined definitely by the associated subsystem controller for controlling the flow of material in the associated subsystem so that the given variable of the process executed by the associated subsystem assumes the target value indicated by said second command signal.*

*10. An automatic control system as claimed in claim 9, wherein each of said subsystem controllers includes a function generator having a preset program solely responsive to said first command signal for determining definitely the second command signal as an output thereof.*

*11. An automatic control system for an electric power plant comprising:*

*a master controller responsive to an external load command signal for producing a main command signal indicative of an amount of electric power to be generated by the Power plant;*

*subsystem controllers coupled to a plurality of subsystems providing individual flows of at least fuel, air and water for executing respective processes relating to generation of the electric power by controlling the flows of the fuel, air and water, respectively, and solely responsive to said main command signal for determining definitely a fuel command, air command and water command, respectively, indicative of target values relating to the flows of the fuel, air and water to enable the subsystems to execute the respective processes for generating the electric power indicated by said main command signal; and*

*means coupled to said subsystem controllers and responsive to the fuel command, the air command and the water command, respectively, determined definitely by said respective subsystem controllers for controlling the respective flows of the fuel, air and water in execution of the processes by the subsystems so that the respective flows in the subsystems assume the target values indicated by the respective commands.*

*12. An automatic control system as claimed in claim 11, wherein said respective subsystem controllers each include a function generator having a preset program responsive solely to said main command signal for determining definitely the respective command.*

*13. An automatic control system of an electric power plant for generating electric power according to a main command signal externally applied thereto, said system comprising:*

*a plurality of driving means coupled to a plurality of subsystems, providing flows of different materials, respectively, which cooperate with each other for con-*

*trolling generation of the electric power by said power plant, each of said plurality of driving means controllably driving a flow of material in the associated subsystem; and*

*plurality of driving means controllers coupled to said subsystems, respectively, each of said controllers being responsive to the main command signal and independent of signals applied to others of said subsystem controllers for providing a non-intermediate output signal solely controlling said driving means in the associated subsystem thereby controlling the generation of the electric power according to the main command signal.*

*14. An automatic control system as claimed in claim 13, wherein each of said subsystem controllers being responsive to the main command signal includes a function generator having a preset program solely responsive to the main command signal for providing the non-intermediate output signal for controlling said driving means in the associated subsystem.*

*15. An automatic control system for an electric power plant comprising:*

*means responsive to an externally applied load command for producing a main command signal indicative of an amount of electric power to be generated by said power plant; and*

*subsystem controllers coupled to subsystems providing flows of different materials relating to generation of electric power, said flows of different materials cooperating with each other for generating electric power by said power plant, respectively, each of said controllers including first means solely responsive to the main command signal for determining definitely a target signal indicative of a target value relating to the flow of the material solely in the associated subsystem according to the main command signal and second means for controlling the flow of the material in the associated subsystem according to the target signal determined definitely by said first means.*

*16. An automatic control system as claimed in claim 15, wherein said first means includes a function generator having a preset program responsive solely to the main command signal for providing the target signal determined definitely.*

*17. An automatic control system of an electric power plant for generating electric power according to a main command signal externally applied thereto, said system comprising:*

*a plurality of driving means coupled to a plurality of subsystems providing flows of different materials, respectively, which cooperate with each other for controlling generation of the electric power by said power plant each of said plurality of driving means controllably driving the flow of material in the associated subsystem; and*

*a plurality of subsystem controllers coupled to said plurality of driving means, respectively, a respective one of said plurality of subsystem controllers being responsive to the main command signal and independent of signals applied to others of said subsystem controllers for providing a non-intermediate output signal controlling said driving means in the associated subsystem without controlling said driving means associated with another one of said subsystem controllers, thereby controlling the generation of the electric power according to the main command signal.*

*18. An automatic control system of an electric power plant for generating electric power according to a main command signal externally applied thereto, said system comprising:*

*a plurality of driving means coupled to a plurality of subsystems, respectively, each for controllably driving a flow of material in the associated subsystem; and*

*a plurality of subsystem controllers coupled to said plurality of driving means, respectively, a respective one of said plurality of subsystem controllers being responsive to the main command signal for providing a non-intermediate output signal controlling said driving means in the associated subsystem without controlling said driving means associated with another one of said subsystem controllers, thereby controlling a parameter according to the main command signal;*

*wherein at least one of said plurality of subsystem controllers provides an intermediate output signal for controlling another one of said plurality of subsystem controllers.*

*19. An automatic control system of an electric power plant for generating electric power according to a main command signal externally applied thereto, said system comprising:*

*a plurality of driving means coupled to a plurality of subsystems, respectively, each for controllably driving a flow of material in the associated subsystem; and*

*subsystem controllers coupled to said plurality of driving means, respectively, each of said subsystem controllers being responsive to the main command signal for providing a non-intermediate output signal solely controlling said driving means in the associated subsystem thereby controlling a parameter according to the main command signal;*

*wherein at least one of said plurality of subsystem controllers provides an intermediate output signal for controlling another one of said plurality of subsystem controllers.*

* * * * *